Patented Oct. 6, 1942

2,297,716

UNITED STATES PATENT OFFICE 2,297,716

METHOD OF PRODUCING ALKYD RESINS

Ralph H. Potts, La Grange, and John E. McKee, Western Springs, Ill., assignors to Armour and Company, Chicago, Ill., a corporation of Illinois No Drawing. Application February 23, 1938, Serial No. 192,183

11 Claims. (Cl. 260—22)

This invention relates to the preparation of a special coating composition including the use of alkyd resins and relates in particular to the formation of a non-yellowing synthetic alkyd resin for use in paints, varnishes, enamels, and the like.

It is customary in the preparation of many types of paint and other protective coating materials to employ in combination with drying oils an alkyd resin produced by the combination of glycerol or other polyhydric alcohol with a dibasic acid and an aliphatic monobasic acid obtained from natural triglycerides by hydrolysis. In some cases the alkyd resin is produced directly from a natural triglyceride. While such materials have met with considerable success they have certain limitations which have retarded their use to some extent.

A principal object of the present invention is the preparation of a coating composition of the type described in which is employed a special synthetic alkyd resin which does not materially change its color after application and which will allow the protective composition to harden with a glossy surface.

An additional object of the invention is the treatment of a particular oil, namely, cottonseed oil, to produce therefrom a special fatty acid composition which is combined with a dibasic acid and a polyhydric alcohol to produce a greatly improved synthetic alkyd resin.

A further object of the invention is the production of a special fatty acid composition from cottonseed oil which has the capacity of reacting with dibasic acids and polyhydric alcohols to form highly desirable coating materials, the process involving the fractional distillation of hydrolyzed cottonseed oil.

These and other objects will be evident upon a consideration of the following explanatory description of the invention.

While the use of alkyd resins has proven of substantial benefit in many protective coating compositions such as paint and unpigmented varnishes, these resins have been produced from available naturally occurring fatty acid mixtures from various vegetable oils. One of the principal oils used for the production of alkyd resins heretofore is soybean oil. The soybean oil is hydrolyzed to produce a natural mixture of fatty acids and this mixture is reacted with glycerol and a dibasic acid such as phthalic anhydride. The present invention is based upon the discovery that a special fatty acid composition can be obtained from cottonseed oil for use in the production of a synthetic resin having superior characteristics over the corresponding resins produced from soybean oil fatty acids or from the fatty acids of other oils. The superior characteristics of the new alkyd resins includes the resistance of the resin to changes in color upon aging. Also, the new type of resin has the very desirable characteristic of forming a hard, glossy surface when used in paint or other coating composition.

The special fatty acid composition may be obtained by the treatment of cottonseed oil or cottonseed oil products such as foots.

In producing the improved fatty acid composition cottonseed oil is subjected to a hydrolysis to split the triglycerides into a fatty acid mixture and glycerine in accordance with well known processes such as the Twitchell process. The resulting mixture of fatty acids is not suitable for the production of synthetic alkyd resins which may be employed with success in paints or varnishes.

After the splitting operation the fatty acid mixtures are subjected to a process for separating the same in accordance with the process defined in our copending application Serial No. 96,732, filed August 9, 1936, of which this application is a continuation in part. This process includes the passage of the fatty acid mixture, together with steam, through a heating zone to raise the temperature of the fatty acids to the extent necessary for distillation at reduced pressures. Thereafter the heated fatty acid mixture is passed into a zone of distillation and expansion, and the resulting fatty acid vapors are passed upwardly through zones of previously condensed cottonseed fatty acids having successively lower boiling points. Ordinarily steam is passed upwardly through the zones of previously condensed fatty acids with the vaporous fatty acids to assist in the fractionating procedure. A substantial quantity of the low boiling fatty acids at the top of the fractionating system is condensed and returned as reflux liquid. The reflux liquid flows downwardly against the current of upwardly rising fatty acid vapors, and the resulting heat exchange causes the zones to have chemical compositions and boiling points corresponding to their vertical positions in the zones.

The heat necessary for the fractionation may be supplied partly by the steam which is employed in the process, partly by recirculation of any undistilled residue which may remain, and partly by the heat imparted to the material in the initial heating step. The hydrolyzation procedure by which the cottonseed oil is split into fatty acids and glycerine generally results in a residual portion of between 2 and 6 per cent of triglycerides which are not split. This residual portion is recovered at the bottom of the zone as undistilled residue.

The operating factors of the process including the amount of reflux returned and the points of draw-off are controlled to recover as an overhead product approximately 25 per cent of the low boiling constituents of the fatty acids.

At the bottom of the fractionating system there may be recovered a fraction containing any undistilled residue together with products of polymerization or oxidation. The quantity of this fraction which is recovered will depend upon the efficiency of the splitting operation and the fractionating process. The intermediate fraction, which in the case of cottonseed oil, may be of the order of 70 per cent of the total quantity of fatty acids entering into the process, is drawn off to be used in the production of alkyd resins. This special intermediate composition is considerably different from natural fatty acid products contained from various oils such as soybean oil, and produces a highly satisfactory alkyd resin which is superior to the alkyd resins generally used in paints and varnishes. As a result of the superior characteristics of the improved composition it is possible to use larger quantities of the alkyd resins in varnishes, paints and the like to considerable advantage.

After separation, the special fatty acid composition is reacted with a polyhydric alcohol such as glycerol and a dibasic acid such as phthalic anhydride. The process by which such reactions are effected is well known and it is not believed necessary to discuss it in particular.

After reaction with the glycerol and phthalic anhydride the resulting alkyd resin may be combined with the other constituents of paint, varnishes and the like and used in the ordinary manner.

When subjected to analysis, the special fatty acid composition from which the alkyd resins are produced may show an iodine value between 130 and 145, a thiocyanogen value of 88.5, a negative hexabromide test, and a mean molecular weight of about 281. In regulating the operative factors of the process the composition of the special fraction is controlled to produce a linoleic acid content of at least 50 per cent, an oleic acid content of not more than 50 per cent, and a content of other and principally lower boiling fatty acids of not more than 5 per cent. The alkyd resins produced from the special fatty acid composition may be used in relatively large quantities in paints, varnishes and enamels which will weather for extensive periods of time without forming the characteristic yellow color of products of this type. Also, when incorporated in a paint, varnish, ink or the like the special composition results in a surface of particularly pleasing glossy appearance.

After recovering the desired fatty acid fraction by removal of low boiling constituents, the product may be improved by subjecting it to chilling to remove relatively high temperature solidifying constituents. Elimination of the latter type of constituents from the fatty acid composition effects a still further improvement in the alkyd resin into which the fatty acids are formed. The amount of fatty acids removed in this manner may be of the order of 5 per cent of the fractionated mixture.

It will be recognized that the particular nature of the special fatty acid composition produced from the cottonseed oil may vary somewhat in its composition without departing from the scope of the invention. The various changes which may be made in the process and the product are intended to be included in the appended claims.

We claim:

1. The process of producing an alkyl resin, which comprises subjecting cottonseed oil to hydrolysis, subjecting the resulting mixture of cottonseed oil fatty acids to fractional distillation, withdrawing at least 20 per cent of the fatty acids from the process as a low boiling overhead fraction, and reacting the remaining high boiling fatty acid composition with a polyhydric alcohol and a dibasic carboxylic acid.

2. The process of producing a synthetic alkyd resin, which comprises subjecting cottonseed oil to hydrolysis, subjecting the resulting fatty acid mixture to fractional distillation to separate the same into a low boiling fraction and a high boiling fraction, cooling the high boiling fraction to partial crystallization, and reacting the uncrystallized portions of said high boiling fraction with a polyhydric alcohol and a dibasic carboxylic acid.

3. The process of producing an alkyl resin, which comprises subjecting cottonseed oil to hydrolysis to produce a mixture of cottonseed oil fatty acids, subjecting the fatty acid mixture to a fractional distillation procedure which includes separation of the fatty acids into a low boiling fraction and a high boiling fraction, and reacting the high boiling fraction of the fatty acids with glycerol and phthalic anhydride.

4. The process of producing an alkyd resin, which comprises subjecting cottonseed oil to hydrolysis, subjecting the resulting mixture of fatty acids to a heating step, passing the heated fatty acids upwardly in vaporous condition through zones of previously condensed fatty acids of progressively decreasing boiling points, condensing the low boiling fatty acids from the top of said zones and returning the same in substantial quantities to said zones as reflux liquid, removing an overhead fraction of not more than substantially 20 per cent of said fatty acids, recovering a fraction containing the higher boiling fatty acids of said mixture, and reacting said higher boiling fatty acid composition with a polyhydric alcohol and a dibasic carboxylic acid.

5. A synthetic alkyd resin, comprising the reaction product of a polyhydric alcohol, a dibasic carboxylic acid, and a fatty acid composition from cottonseed oil fatty acids, said fatty acid composition containing at least 50 per cent linoleic acid.

6. A synthetic alkyd resin, comprising the reaction product of a polyhydric alcohol, a dibasic carboxylic acid, and a cottonseed oil fatty acid composition containing the high boiling constituents of the cottonseed oil fatty acids and comprising not more than 80 per cent of the normal cottonseed oil fatty acid fraction.

7. A synthetic alkyd resin, comprising the reaction product of glycerol, phthalic anhydride, and a special cottonseed oil fatty acid composition having the lower boiling constituents of normal cottonseed oil fatty acids eliminated.

8. A synthetic alkyd resin, comprising the reaction product of a polyhydric alcohol, a dibasic carboxylic acid, and a special fatty acid composition obtained from cottonseed oil fatty acids, said special oil fatty acid composition comprising not more than approximately 80 per cent of the constituents of the original fatty acid mixture and including a fraction having the high boiling constituents thereof, said fraction containing at least 50 per cent linoleic acid and not more than 50 per cent oleic acid.

9. The process of producing an alkyd resin, which comprises subjecting a cottonseed oil to hydrolysis to produce a mixture of fatty acids, subjecting the mixture of fatty acids to a fractional separation process including the passage of the fatty acids in vaporous form upwardly through a series of zones of condensed fatty acids having successively lower boiling points, returning the lower boiling portions of said fatty acids to said zones as reflux liquid, withdrawing a sufficient quantity of low boiling fatty acids from the upper portions of said zones to provide an intermediate product having at least 50 per cent linoleic acid, and reacting said product with a polyhydric alcohol and a dibasic carboxylic acid.

10. In the production of an alkyd resin by the process which comprises preparing a fatty acid composition and reacting the same with a polyhydric alcohol and a dibasic carboxylic acid, the steps which include heating a mixture of cottonseed oil fatty acids, passing the heated fatty acids upwardly in a vaporous condition through zones of previously condensed fatty acids of progressively decreasing boiling temperatures, condensing relatively low boiling fatty acids from the upper of said zones, returning the condensed acids in substantial quantities to said zones as reflux liquid, and recovering for said fatty acid composition a liquid fraction from a lower of said zones comprising not more than about 80 per cent of said cotton seed oil fatty acid and containing at least 50 per cent linoleic acid.

11. In the production of alkyd resins by the process which includes preparing a fatty acid composition and reacting the same with a polyhydric alcohol and a dibasic carboxylic acid, the steps which comprise vaporizing cottonseed oil fatty acids, passing the vaporized fatty acids upwardly through zones of condensed fatty acids of progressively decreasing boiling temperatures, condensing relatively low boiling fatty acids from the upper of said zones, returning the condensed acids in substantial quantities to said zones as reflux liquid, and removing from an intermediate zone for said fatty acid composition a liquid fatty acid fraction containing at least 50 per cent linoleic acid, not more than 50 per cent oleic acid, and not more than 5 per cent of other and principally lower boiling acids.

RALPH H. POTTS.
JOHN E. McKEE.